Oct. 8, 1963

H. LACKS ETAL 3,106,247

FIRE FIGHTING APPARATUS

Filed March 26, 1962

INVENTORS:
MILTON LAMBERT
HYMAN LACKS

BY

Max D. Farmer

ATTORNEY

Oct. 8, 1963  H. LACKS ETAL  3,106,247
FIRE FIGHTING APPARATUS
Filed March 26, 1962  13 Sheets-Sheet 4

INVENTORS
HYMAN LACKS
MILTON LAMBERT
BY
Max H. Farmer
ATTORNEY

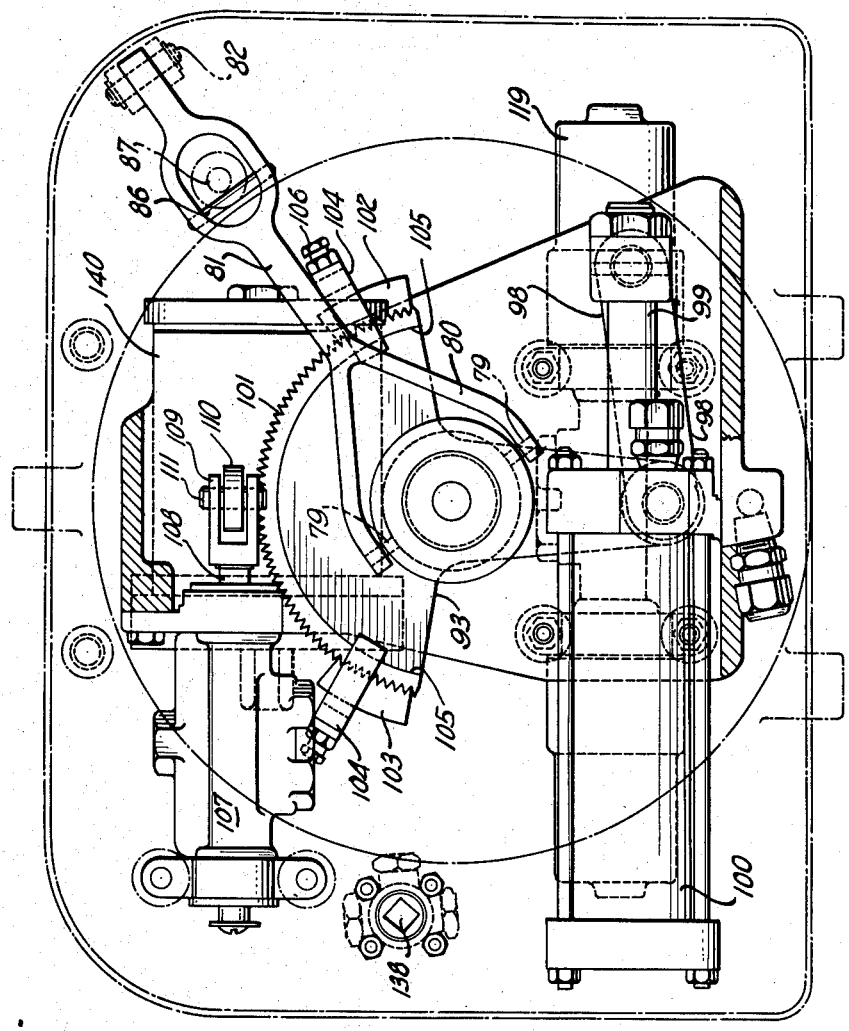

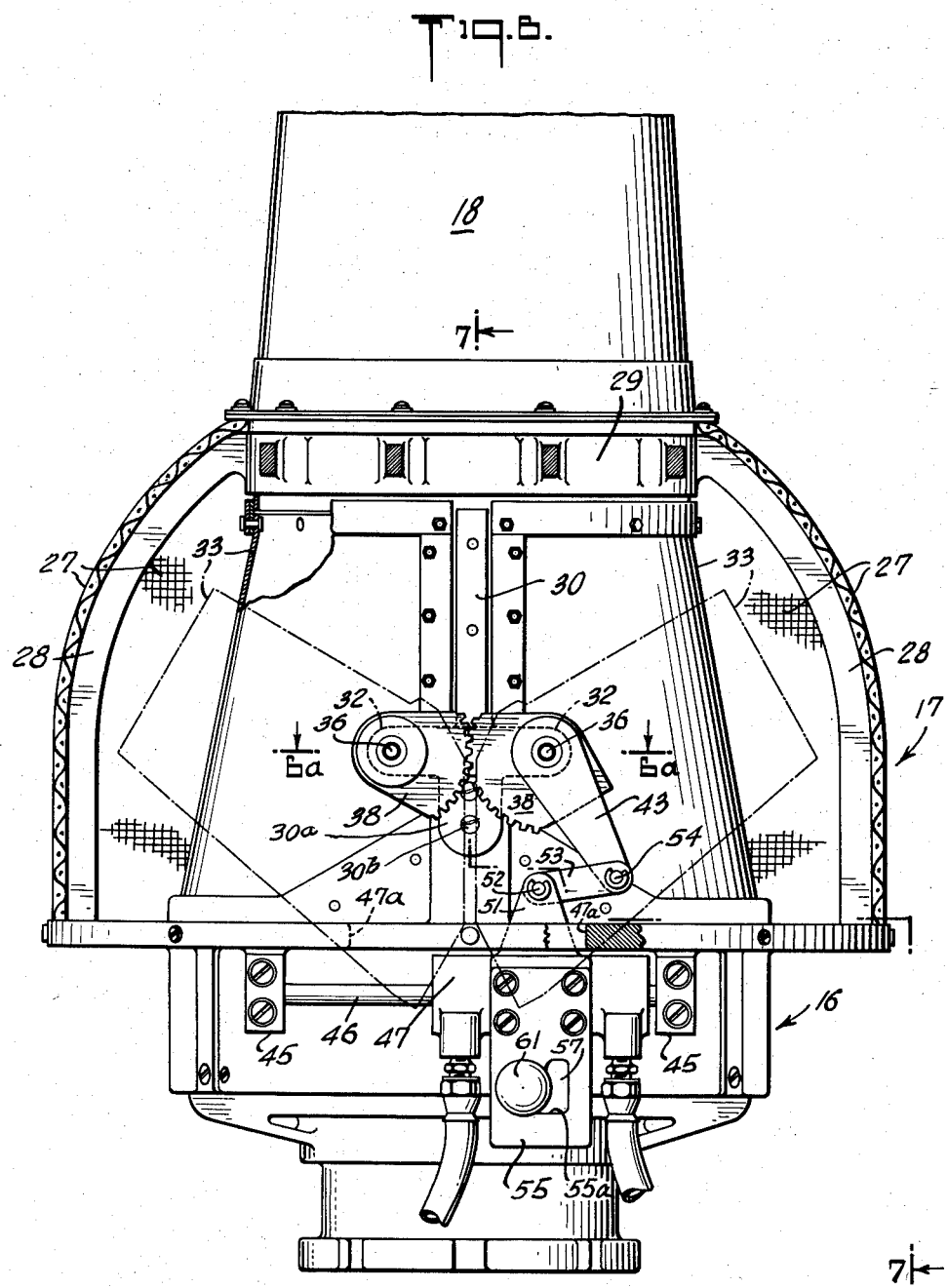

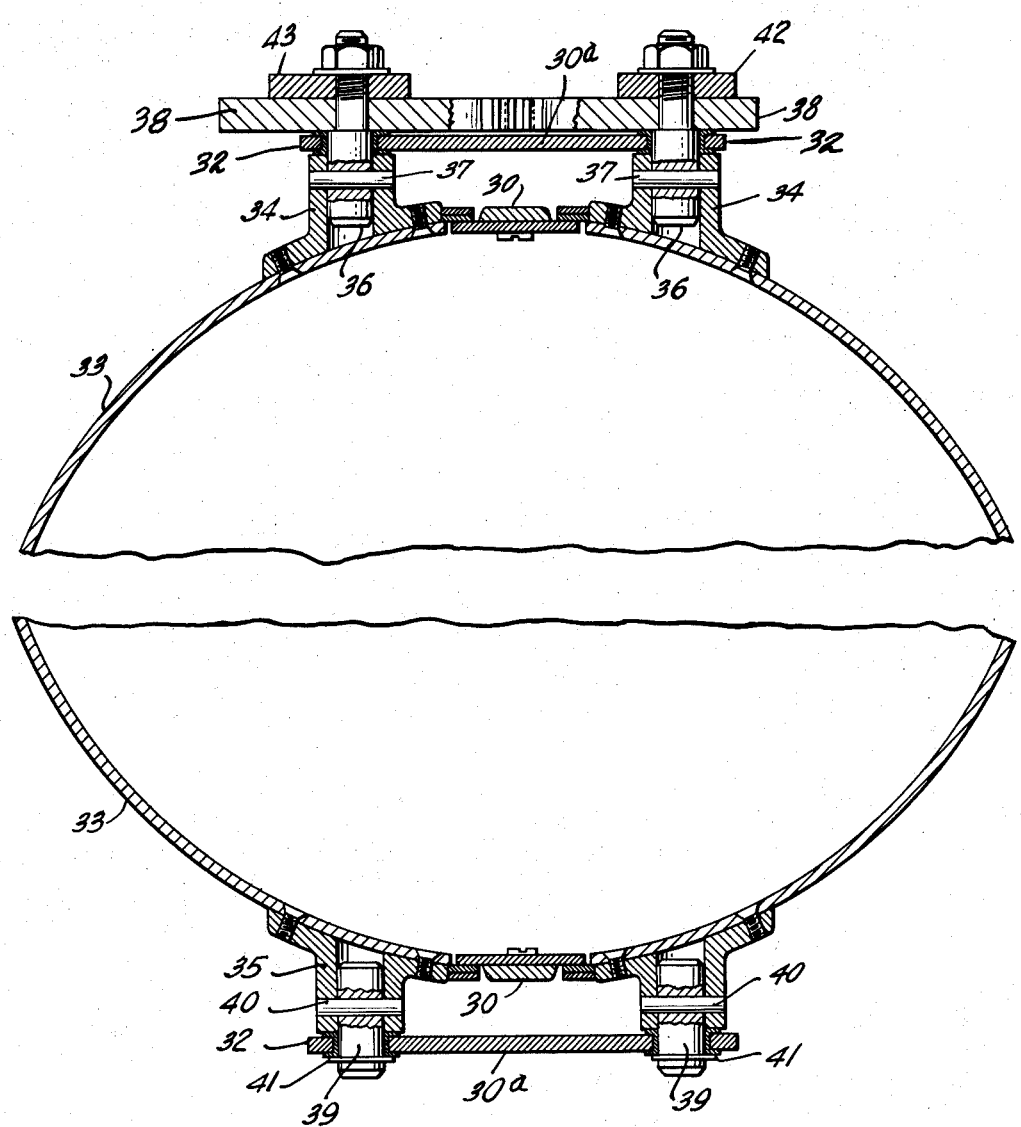

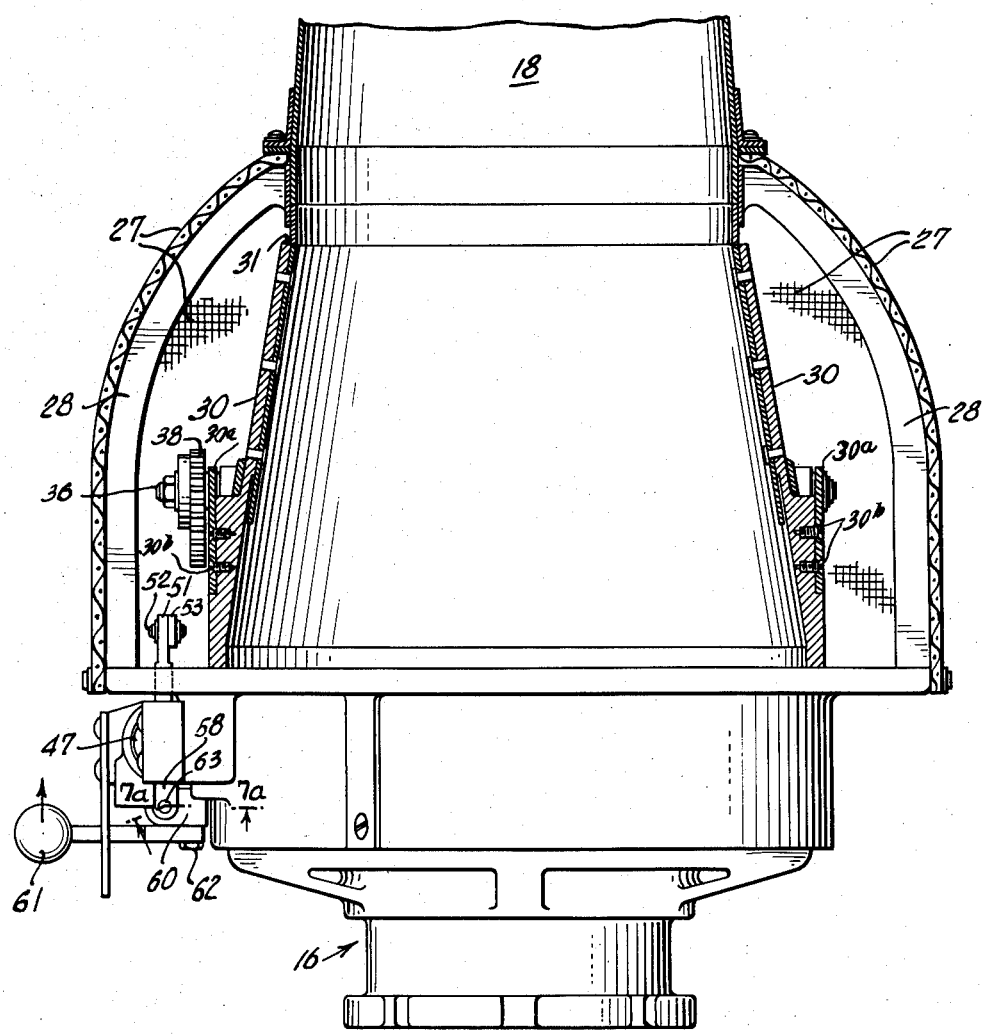
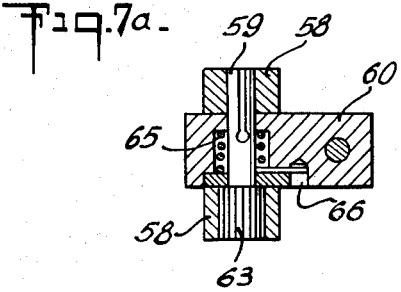

Oct. 8, 1963
H. LACKS ETAL
3,106,247
FIRE FIGHTING APPARATUS
Filed March 26, 1962
13 Sheets-Sheet 10
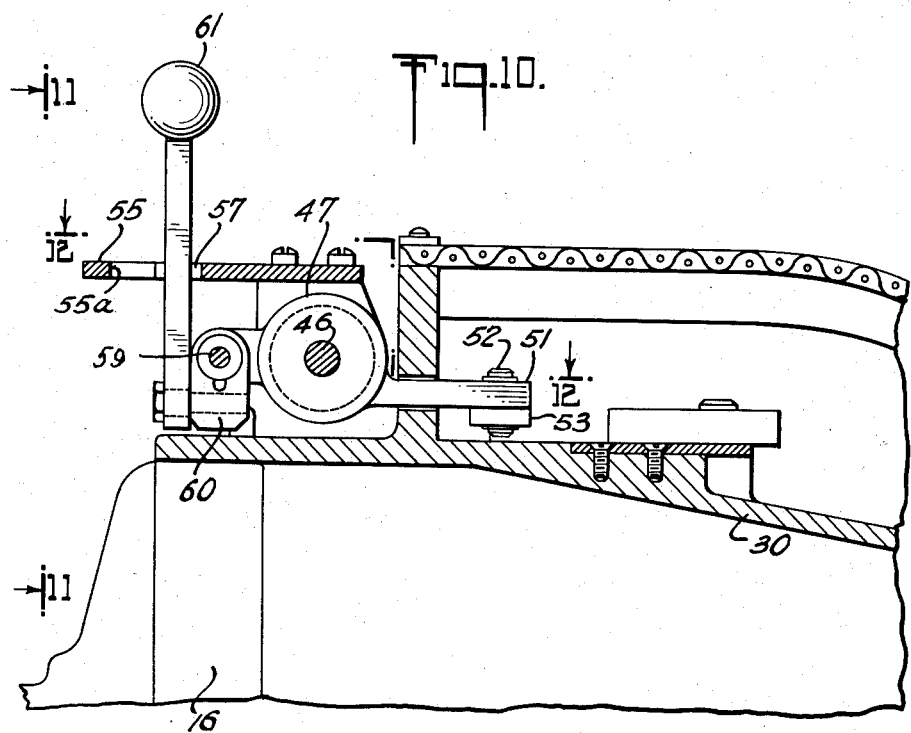
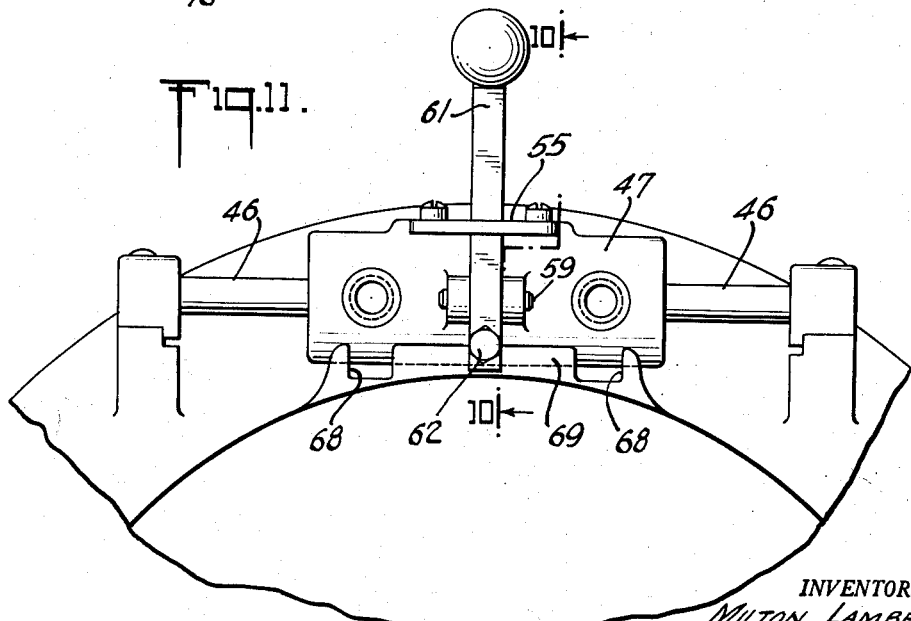
INVENTORS:
MILTON LAMBERT
HYMAN LACKS.
BY
Max A. Farmer
ATTORNEY Oct. 8, 1963 H. LACKS ETAL 3,106,247
FIRE FIGHTING APPARATUS
Filed March 26, 1962 13 Sheets-Sheet 11

INVENTORS:
MILTON LAMBERT
HYMAN LACKS
BY
Max D. Farmer
ATTORNEY

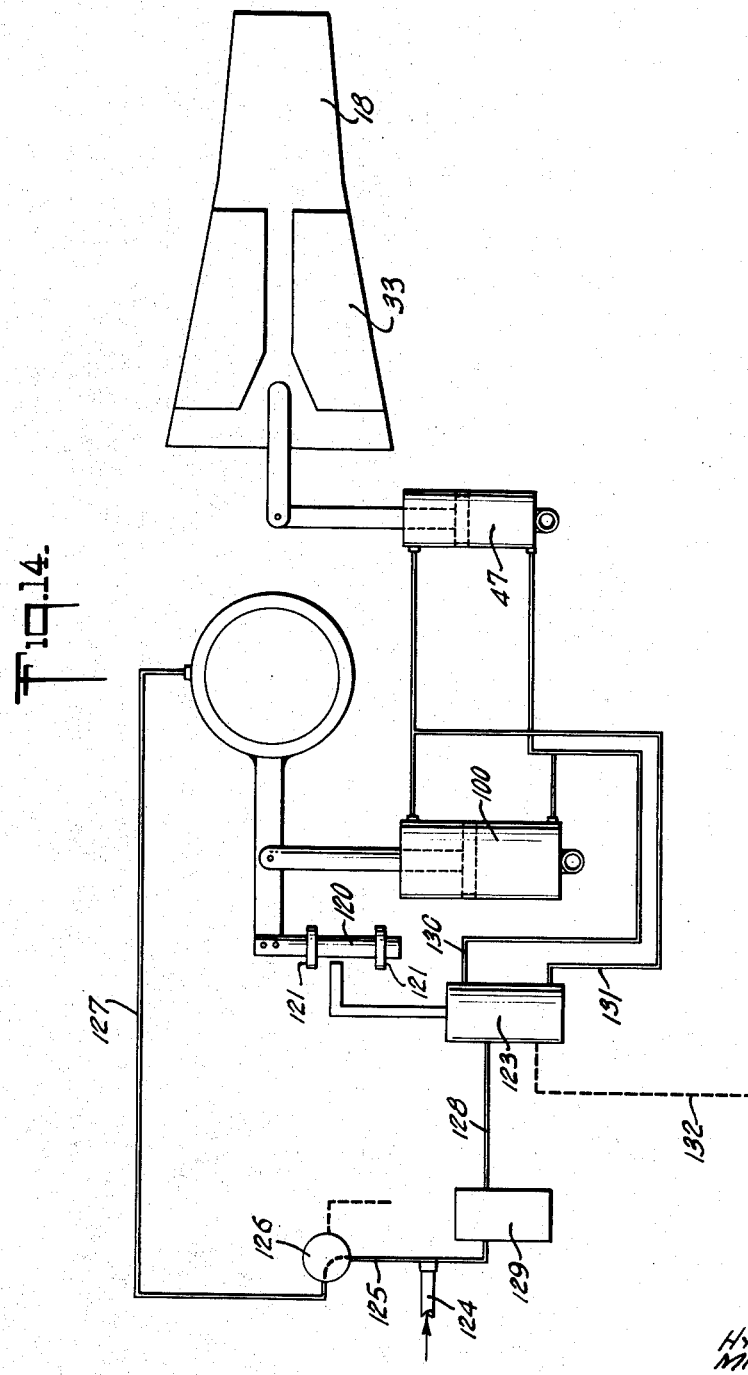

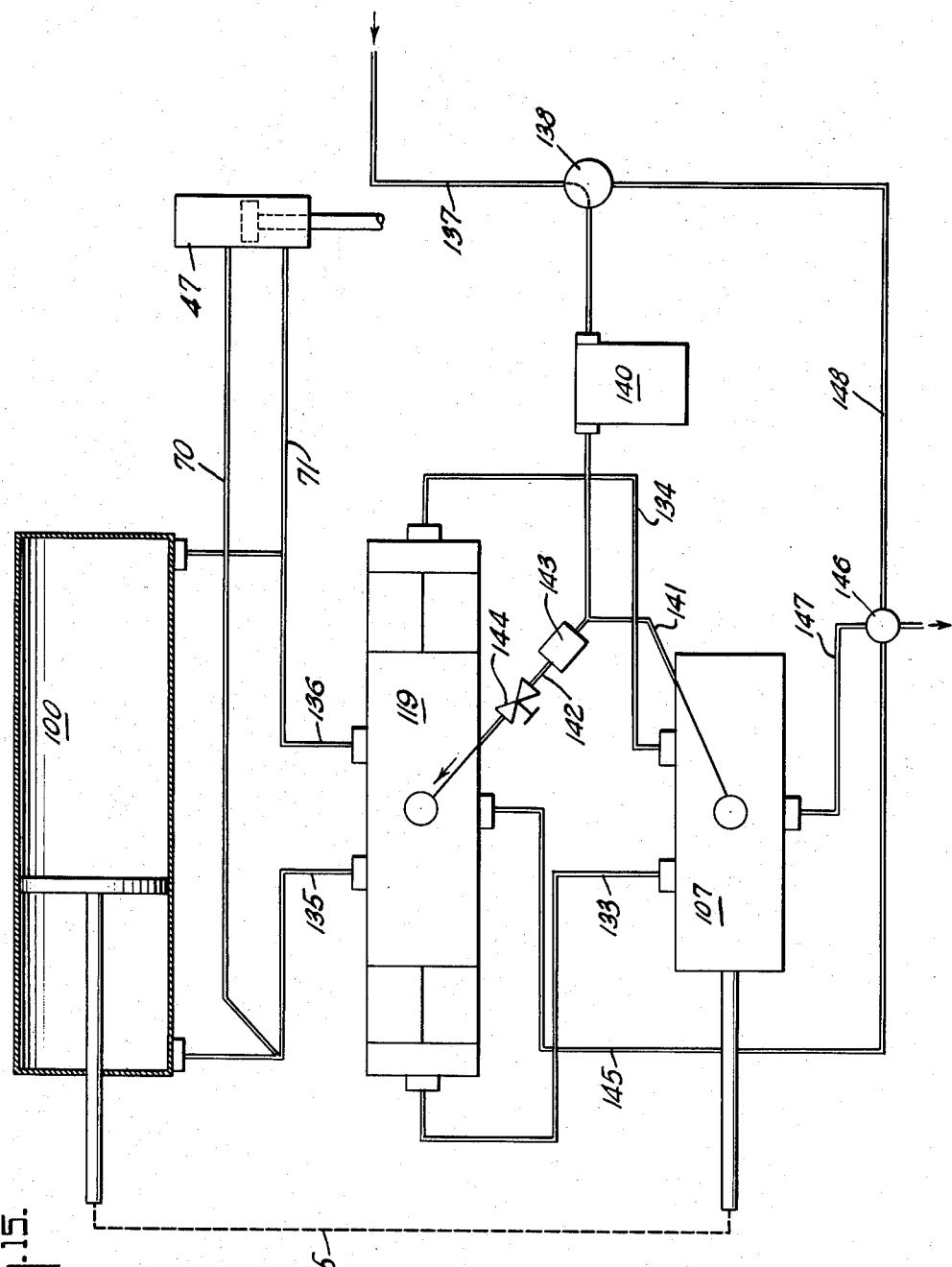

United States Patent Office 3,106,247
Patented Oct. 8, 1963

3,106,247
FIRE FIGHTING APPARATUS
Hyman Lacks, 2042 Colden Ave., Bronx, N.Y., and Milton Lambert, 6236 Ellwell Crescent, Rego Park 74, N.Y.
Filed Mar. 26, 1962, Ser. No. 182,694
23 Claims. (Cl. 169—25)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for use in extinguishing fires, and which is particularly useful in fighting fires from a position remote from the fire such as when vision of the fire is obstructed or the fire or contamination around or adjacent the fire prevents or limits access to the area of the fire. It has particular application aboard ships in connection with fixed, high-capacity foam systems for fighting fires.

Objects of the invention are to provide an improved, simple and novel apparatus for such fire fighting, whose operation can be selectively under manual or automatic control, which is capable of selectively discharging a long range liquid stream or a short range liquid stream with a dispersed foam pattern, which may employ the foam-liquid fire fighting solution under pressure to oscillate the nozzle and to provide alternate discharge of a straight stream and a stream with a dispersed pattern on alternate sweeps of the nozzle from side to side and through any preset angle of elevation or inclination during automatic operation, which may be set to operate automatically upon the happening of any of selected conditions such as when the heat in an area exceeds a selected safe condition, whose oscillation may be of variable, selected extents, which may be adjusted to vary the pattern and the inclination to the horizontal of the liquid stream of fire fighting liquid delivered, which may utilize the fire fighting liquid under pressure as the motive power for activation of some of the operations of the unit, and which will be relatively simple, practical, compact, dependable, effective, easily controlled and inexpensive.

Other objects and advantages will be apparent from the following description of an example of the invention, and the novel features will be particularly pointed out in connection with the appended claims.

In the accompanying drawing:

FIG. 5 is a sectional plan of the same, with the section taken approximately along the line 5—5 of FIG. 4;

FIG. 6 is a plan partly in section of the nozzle part of the unit;

FIG. 6a is a transverse sectional elevation of the nozzle, with the section taken approximately along the line 6a—6a of FIG. 6;

FIG. 7 is a sectional elevation of the nozzle part of the unit, with the section taken approximately along the line 7—7 of FIG. 6;

FIG. 7a is a sectional elevation taken approximately along the line 7a—7a of FIG. 7, and in twice the size of the same parts in FIG. 7;

FIG. 10 is a sectional elevation of a portion of the unit shown in FIG. 1, with the section taken approximately along the lines 10—10 of FIGS. 11 and 12, and illustrating the nozzle shutter control;

FIG. 11 is a front elevation of the same as viewed from the line 11—11 of FIG. 10;

FIG. 14 is a simplified piping diagram illustrating generally the principle of the coordination of the nozzle functions; and FIG. 15 is another piping diagram that may be used for coordinating the various operations of the nozzle.

Figure 1:
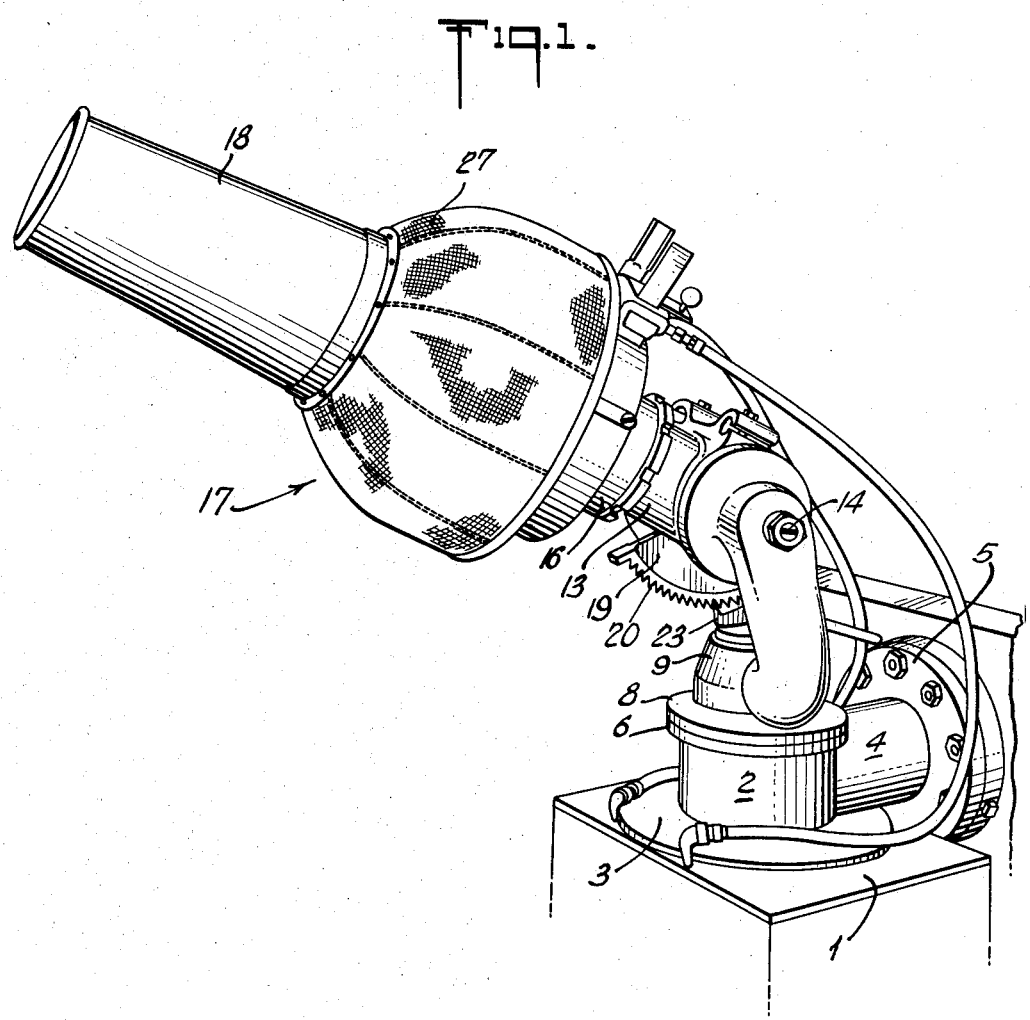
FIG. 1 is a perspective of a unit constructed in accordance with this invention and illustrating one example of the same.
Figure 2:
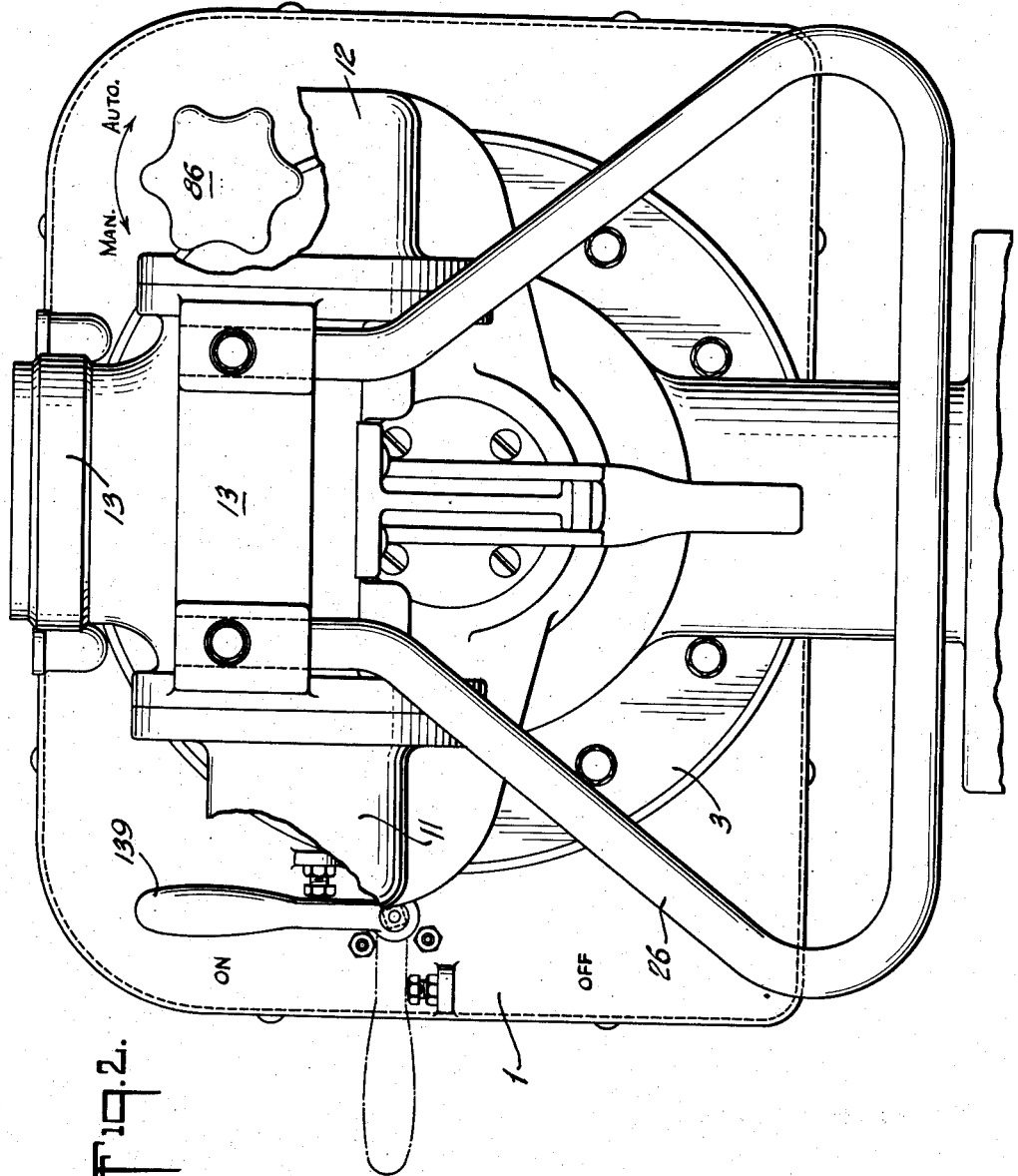
FIG. 2 is a plan of part of the unit shown in FIG. 1.

In the illustrated embodiment of the invention and referring first to FIGS. 1 to 4, the device is mounted on a platform 1 or any suitable support, and employs a base 2 having a flange 3 which is carried on the top of the platform. The base 2 has a tubular extension 4 on its side which terminates in a flange 5 by which it may be bolted or coupled to a pipe that supplies a fire extinguishing liquid under high pressure. The base 2 has a flange 6 on its top around a discharge opening 7 (FIG. 4) upon which is rotatably confined the flange 8 of a tubular member 9. The member 9 has a downward opening 10 (FIG. 4) which is aligned and communicates with the opening 7 in the base 2, and also has two tubular arms 11 and 12 (FIG. 3) extending from opposite sides thereof and upwardly. An element 13 (FIG. 3) is rotatably confined between the upper ends of arms 11 and 12 by a rod or bolt 14 which passes through the arms and also through a bearing member 15 within the element 13. The faces of the element 13 that abut the arms 11 and 12, around the rod or bolt 14, are open faces so that the passages in the arms 11 and 12 are always in communication with the interior of element 13 in all of the angular positions of the element 13 as it rocks on the arms 11 and 12.

The element 13 has an upwardly inclined opening serving as a delivery end over which is fitted one end 16 of a nozzle 17 (FIG. 1), the other end of which nozzle is a relatively long, convergingly tapered tube 18 that is used to deliver a fairly solid, relatively high velocity stream of fire fighting liquid. The rotatable mounting of the element 13 between the arms 11 and 12 enables the nozzle to discharge the liquid at any of selected elevations or inclinations over a substantial range. A sector element 19 is fixed to the element 13 and carries ratchet teeth 20 on a circular part of its periphery. A ratchet pawl 21 (FIG. 4) is pivoted at 22 on an upstanding support 22a (FIG. 3) on the member 9 between the arms 11 and 12 with its nose 23 engaging with the ratchet teeth 20 successively under the urging of a spring 24 acting between a pin 25 on the pawl 21 and the member 9. The pawl 21 rides idly over the ratchet teeth 20 when the nozzle 17 is rocked to increase the inclination of the delivery tube 18, but engages with the teeth to prevent rocking movement of the nozzle in the opposite direction as urged by gravity, until the nose of the pawl is withdrawn from the teeth 20. The element 13 may have a somewhat U-shaped bar 26, shown only in FIGS. 2 and 4, secured to the element 13 in a position to be grasped by a person operating the nozzle 17 to vary the inclination of the nozzle and to shift it from side to side manually.

The nozzle 17 as shown in FIG. 1 has between the tapered tube 18 and the entrance end 16 for the fire fighting liquid, an intermediate wall 27 of open mesh screening, shown in FIGS. 1, 6, and 7, through which some of the fire fighting liquid may escape for close range fire fighting unless the passage through the nozzle prevents this, as will be explained later herein. The tube 18 is connected or coupled to the nozzle end 16 by a plurality of narrow arms 28 (FIGS. 6 and 7) which connect an annular ring 29 on tube 18 to the nozzle end 16. The wire screen wall 27 surrounds and is secured to the arms 28 so as to form a somewhat annular continuous screen wall between tube 18 and the end 16, as shown in FIG. 1.

Referring now particularly to FIGS. 6, 6a and 7, which illustrate the nozzle, the neck 16 at its top and bottom has rigid arms 30 that extend to the tube 18 and are welded thereto by welding 31. Mounted on each of the arms 30 by screws 30b is a plate 30a that has laterally extending lugs 32 (FIGS. 6 and 7) which plates are employed to pivotally mount two shutters 33 that are complementary and together may form a conduit connecting the passage in the neck 16 with that in the base end of the tube 18. Each section 33 carries a lug 34 at its top and a lug 35 at its bottom, the lugs 34 and 35 on each shutter 33 having axially aligned cavities. Each top lug 34 has a bearing stud 36 in its cavity which is removably confined therein by a pin 37 which passes transversely through the lug 34 and the stud 36. Each stud 36 extends upwardly from its lug 34, through the ears 32 of plate 30 and has an upper reduced end portion which rotatably mounts a sector gear 38. The sector gears 38 mesh with one another, as shown in FIG. 6, so that when one sector gear is rotated, both will be rotated.

Each bottom lug 35 has a downwardly opening cavity in which a bearing stud 39 is removably confined by a pin 40 that passes transversely through the lug 35 and the stud 39. The stud 39 depends below its lug 35, passes downwardly through and is pivoted in the lower plate 30, and the lower plate 30 is confined on the lower end of the stud against the lug 35 by a split, spring ring 41 in an annular peripheral groove in the depending end of the stud 39. Thus each shutter 33 is pivoted by its lugs on the plates 30 and geared together by the sector gears so that they open together and close together. The closed positions of the shutters are shown in FIG. 6 by full lines, and in open or separated positions by the dot and dash lines. The shutters are complementary and when together will form an open ended but otherwise closed passage or conduit. The sector gears are confined on the upper ends of studs 36 by a spacer member 42 on the right hand stud 36 in FIG. 6a, and an arm 43 on the right hand stud 36 (FIG. 6a) this arm 43 being fixed as by screws (FIG. 6) to the sector gear that is on the left in FIG. 6a. The arm 43 serves as a means by which the shutters may be swung into complementary positions, shown by full lines in FIG. 6, in which they form the open ended but otherwise substantially closed passage between the neck 16 and the tube 18. The shutters, of course, have substantially impervious walls.

When in open positions as shown by the dot and dash lines in FIG. 6, the space between the neck 16 and the tube 18, within the enclosing wire mesh 27, is open sidewise so that the fire extinguishing liquid being delivered to tube 18 from neck 16 can expand and much of it pass outwardly through the mesh sidewise for short range fire fighting, with the balance of such liquid continuing to pass outwardly through tube 18 as a stream moving at a slower velocity, also for short range fire fighting. An adjustment to release some of the liquid sidewise through a wire mesh screen for short range fire fighting is broadly disclosed in our Patent No. 2,894,694 of July 14, 1959 but which employs a different structure for that purpose. The plates 30 may have thin plates 44 secured, as by screws, to the inner faces thereof and which are wider than plates 30 so as to form flanges along the sides of plates 30 over which the side edge of the shutters may slide or overlap to form a fairly tight closure between the adjacent side edges of the shutters.

Secured to the exterior of neck 16 are spaced bosses 45, FIG. 6, between which a piston rod 46 extends and held fixed thereby. The rod 46 extends entirely through a cylinder 47 (FIG. 13) from end to end thereof, and within the cylinder the rod 46 has a piston 48 fitting the cylinder. The end walls 49 of the cylinder are removable in, but confined to, the ends of the body of the cylinder, against shoulders, by split retaining rings 50 that abut the outer ends of the end walls 49 and are held in annular grooves in the inside peripheries of the body of the cylinder. The usual sealing gaskets are provided between the end walls 49, and the piston rod 46 and the body of cylinder 47. Thus when fluid under pressure is supplied alternately to opposite sides of piston 48, with the other ends of the cylinder 47 alternately vented, the cylinder 47 will be caused to reciprocate along the stationary piston rod 46. The cylinder 47 has a lug 51 (FIG. 6) which extends through a slot 47a in the ring 16 and at its free end it is pivotally connected by pivot 52 to one end of a link 53, the other end of which is pivotally connected by a pivot 54 to the free end of the arm 43. The link 53 extends generally in the direction in which the cylinder 47 reciprocates, so that as that cylinder is reciprocated it will rock the arm 43 back and forth and thus move the shutters between their positions (full lines in FIG. 6) in which they form a closed liquid passage from the neck 16 to the tube 18, and their positions (dot and dash lines in FIG. 6) in which they separate and allow much of the liquid being discharged by the nozzle to pass through the wire mesh screen 27 for short range fire-fighting.

Secured to the cylinder 47 (FIGS. 6, 10–12) is a plate 55 which carries a somewhat U-shaped aperture 55a the parts of which provide end slots 56 and 57, with the slot 56 shorter than the slot 57. The cylinder 47 has two spaced lugs 58 between which is pivoted on a pin 59, a latch element 60 which is spring biased in a clockwise direction (in FIGS. 7 and 10). A handle 61 is secured by a screw 62 to the forward edge of element 60, and extends upwardly through the aperture 55a of plate 55. The relatively short and long slots 56 and 57 limit the forward or unlatching movement of the handle 61 and latch element 60. The latch element 60 (see FIG. 7a) has a passage therethrough from face to face which is axially aligned with passages in the bearing lugs 58. The pin 59 has a head 63 with straight line or axial knurling or fine grooves on its periphery which matches with and fits similar knurling or grooves on the wall of the passage through that boss 58 which is at the left in FIG. 11, so that when the pin 59 is forced through the bosses 58, the knurlings will interlock and keep the pin 59 from rotating in the bosses 58. The shank of pin 59 from its free end opposite from its head has a milled slot 64 along a diameter of the pin and extending about half way lengthwise through the element 60. The passage in element 60 for the pin 59 is larger in diameter at the end adjacent the head 63 of the pin 59 that extends nearly for the full length of that passage to provide an annular chamber around the shank of pin 59 in which is disposed, encircling the pin shank, a helical spring 65, one end of which spring is bent radially and slidingly received in the slot 64. The face of the element 60 abutting the head 63 has a recess approximately concentric with the axis of the pin along which the other end of the spring extends to a small cavity 66 in which that spring end is suitably anchored. A washer 67 is received flush in a recess in the side face of the element 60 to confine the spring and keep the adjacent end of it in the cavity 66. The spring end which is disposed in the slot 64, is inserted therein before the head 63 is inserted into its related boss 58.

The pin 59 is first rotated to tension the spring and then the pin is forced into the position in the bosses as shown in FIG. 7a, so that the intermeshing knurling between the inner periphery of the boss and the outer periphery of the head 63 will keep the spring 65 tensioned.

Figure 13:
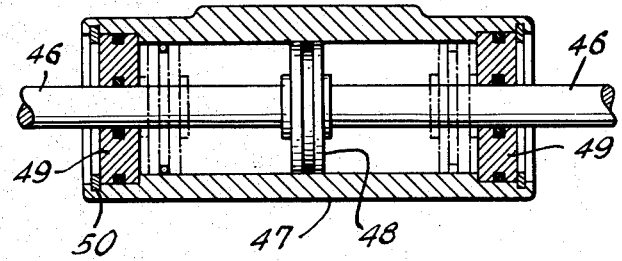
FIG. 13 is a sectional elevation of a hydraulic motor used to operate the shutters of the nozzle.

The action of the tensioned spring is in a direction to urge the rod 61 into one of the notches or slots 56 or 57. When the rod 61 is released in alignment with the longer or deeper slot 57, the spring 65 will rock the latch element 60 out of the path of any notches 68 (FIG. 11) in a rib 69 on the ring 16. The cylinder 47 is then free for reciprocation by liquid alternately applied to opposite sides of the piston 48 (FIG. 13).

When the rod 61 is released while in alignment with the shorter slot 56, the spring 65 will urge the rod into that notch, but this limited movement is not enough to remove element 60 from a notch 68 in rib 69 and will also ride against a face of rib 69 as the cylinder 47 reciprocates and then will snap into that one of the notches 68 with which it first becomes aligned as it moves with the cylinder. The cylinder will then be locked and held against further reciprocation until the rod 61 is removed from the short notch 56 and placed in the longer notch 57. Flexible pipes 70 and 71 are connected to the end portions of the cylinder 47 for supplying operating fluid to opposite sides of the piston 48. Thus the shutters can be caused to open and close repeatedly as the nozzle oscillates, or be locked against oscillation, as may be desired.

Figure 3:
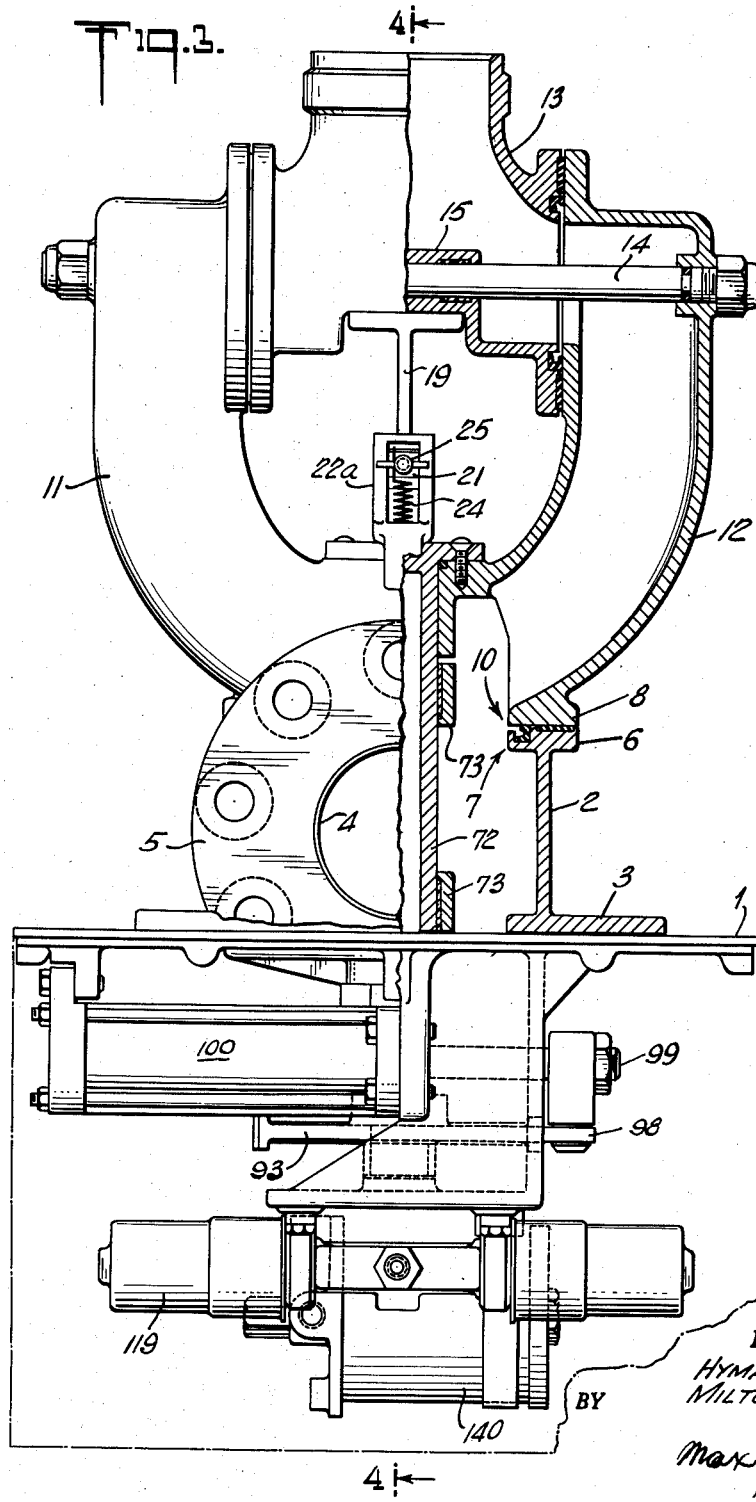
FIG. 3 is a rear elevation, partly in section, of the unit shown in FIG. 1.
Figure 4:
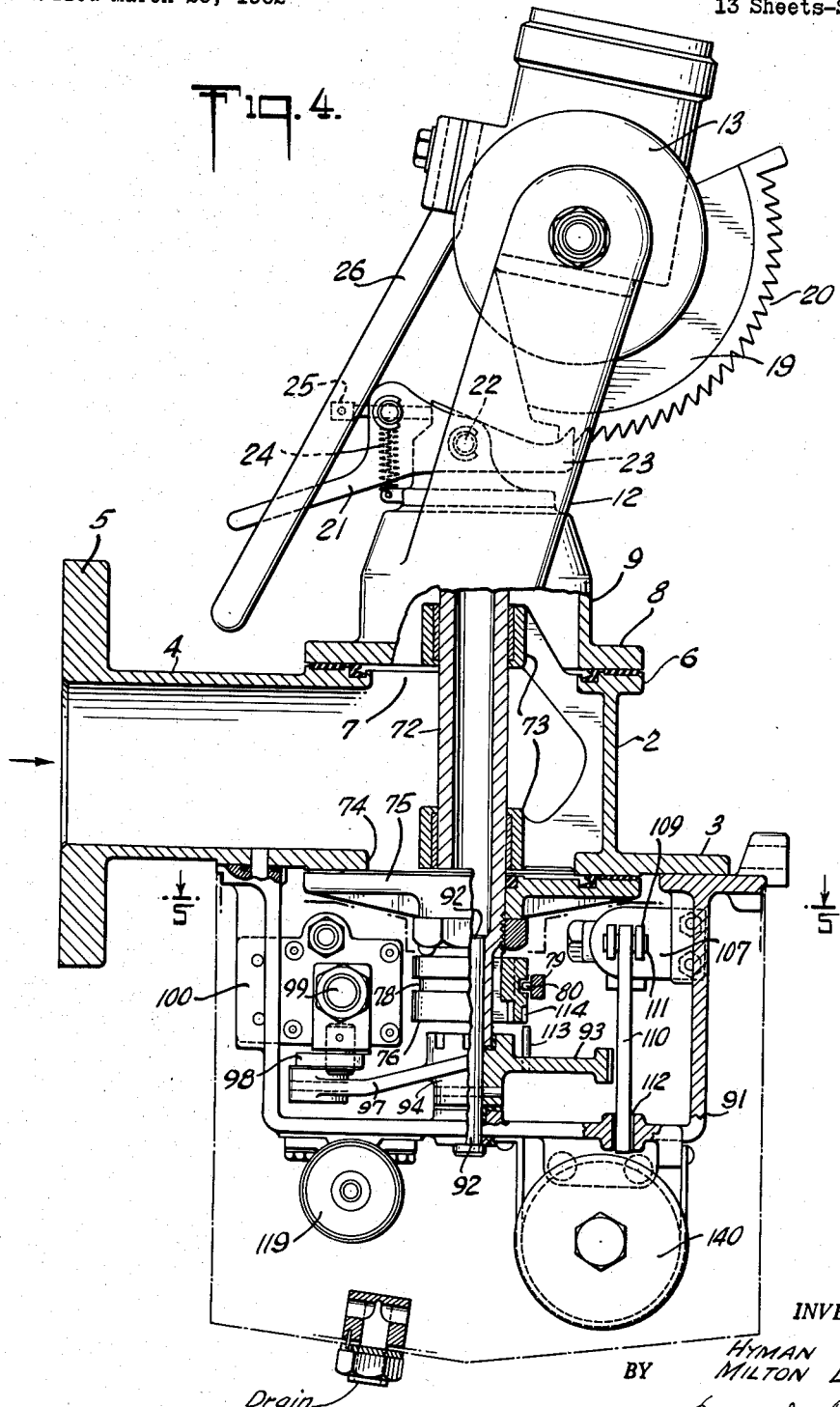
FIG. 4 is a side elevation, partly in section of the same, the section being taken approximately along the line 4—4 of FIG. 3.
Figure 8:
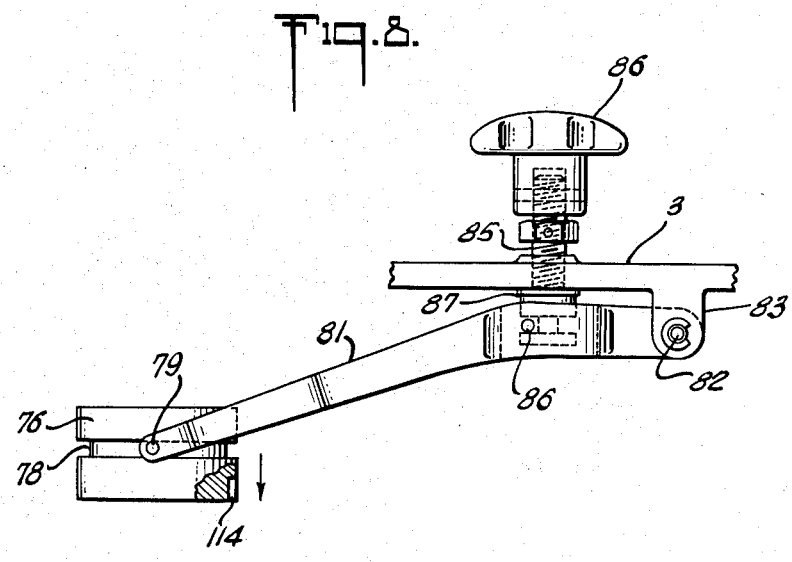
FIG. 8 is an elevation of some of the parts that are illustrated in FIG. 5.

Referring next to FIGS. 4 and 5 particularly, a tube 72 is fixed to the interior of member 9 (as shown in FIG. 3) to rotate with and depend therefrom through the opening 7 in the base 2. The base 2 has within its chamber and spaced apart vertically bearings 73 for the tube 72. The tube 72 depends below the lower bearing 73 and passes through an opening 74 in the bottom wall of base 2 and also passes centrally through and is keyed or secured to a plate 75 which closes the opening 74 while rotating or oscillating with the tube 72. A clutch collar 76 is keyed by key 77 to the tube 72 below the plate 75, so as to slide along the tube 72 to a limited extent. This collar 76 has an annular peripheral groove 78 in which run aligned pins 79 on the free ends of the arms 81 of a forked end of a lever 81. Lever 81 is pivoted by pin 82 (FIG. 8) to a lug 83 depending from the bottom of base 3. Between its pivot pin 82 and its forked end, the lever 81 has an open loop 84 (FIG. 5) with a pin 86 passing across the loop in a direction crosswise of the length of the lever. A control screw 87 with an operating knob 88 on its upper end is threaded through the bottom of the base 2 and at its lower end it has fixed thereto a collar 89 with an annular peripheral groove 90 across which the pin 86 extends somewhat tangentially thereof, as shown in FIG. 5. By turning knob 86 the clutch collar 76 may be caused to move up and down on the tube 72.

A somewhat U-shaped frame 91 is secured to the under face of the bottom of base 2 (FIG. 4) and it rotatably supports a stud 92, which is axially aligned with the passage of the tube 72 and extends upwardly into and along the tube for a substantial distance. A sector shaped member 93 (FIGS. 4 and 5) has a hub 94 through which the stud 92 passes and to which it is fixed by a transverse pin 95 that passes through the hub and stud to lock them together. The member 93 thus may oscillate about the axes of the stud 92 and the tube 72 and rests on a nylon washer 96 provided on a bearing boss on the frame 91. An arm 97 on the member 93 (FIGS. 4 and 5) is pivoted at its free end to one end of a link 98 whose other end is pivoted to one end of a piston rod 99 which extends outwardly and horizontally from one end of a drive cylinder 100 (see also FIG. 3). The end of member 93 opposite from the arm which is articulately connected by link 97 to the piston 99 of the drive cylinder 100 has an edge in an arc of a circle in which inclined ratchet teeth 101 are formed. The arc edge has its center of curvature in the axis of stud 92 to which it is pinned. Blocks 102 and 103 abut the ratchet teeth and have teeth meshing with such ratchet teeth 101 (FIG. 5) and are adjustably confined to the latter by clamps 104 each of which engages behind an arcuate shoulder 105 on the member 93 and has a screw 10 which presses the blocks 102 and 103 against the ratchet teeth 101. Thus the blocks 102 and 103 may be confined in different, spaced apart positions on member 93 along the ratchet teeth 101 and such positions changed from time to time as desired.

A four way valve 107, FIGS. 4 and 5, is mounted in a horizontal position on lugs provided on the frame 91 near but somewhat below the base 3. It has a valve element 108 extending out of one end thereof and terminating in a fork 109 (FIG. 5) between the arms of which a stop link 110 is pivoted by pin 111. The link 110 depends from element 108 and its lower end is loosely received in a slot 112 (FIG. 4) provided in the bottom of the frame 91, so that as the element 108 reciprocates the lower end of link 110 can rock in the slot as a fulcrum. This link 110 extends adjacent to and past the ratchet teeth 101 in the paths of arcuate movement of the blocks 102 and 103, so that as the member 93 is oscillated by piston rod 99 of the drive cylinder 100, the blocks 102 and 103 may alternately engage against opposite sides of link 110, rock it about its slot fulcrum, and move the valve rod 108 of four way valve 107 back and forth.

This back and forth oscillation of the sector element 93 is to be transferred at times to the member 9 which mounts the nozzle and for this purpose the element 93 has an upstanding pin 113 which is positioned radially of the axis of stud 92 to enter a vertical groove or channel 114 in the periphery of the collar 76 and running vertically from the lower end face of the collar. Thus when knob 86 (FIGS. 2 and 8) is rotated, it will elevate or lower the collar 76. When the collar 76 is in the position shown in FIG. 4 the pin 113 is out of the groove 114 and there is no coupling between the member 93 and the collar 76 which is keyed to the tube 72. Oscillation of member 93 will not cause any oscillation of the tube 72 and of the nozzle to which tube 72 is fixed. When collar 76 is lowered from the unclutched position shown in FIG. 4, by rotation of knob 86, the groove 114 will be lowered and receive the pin 113, so that the member 93 will be then coupled to the tube 72, and any oscillations of the member 93 will be transmitted to the tube 72 and through it to the nozzle. This causes the nozzle to oscillate with the member 93 caused by reciprocations of the piston 99 that extends out of cylinder 100.

Figure 9:
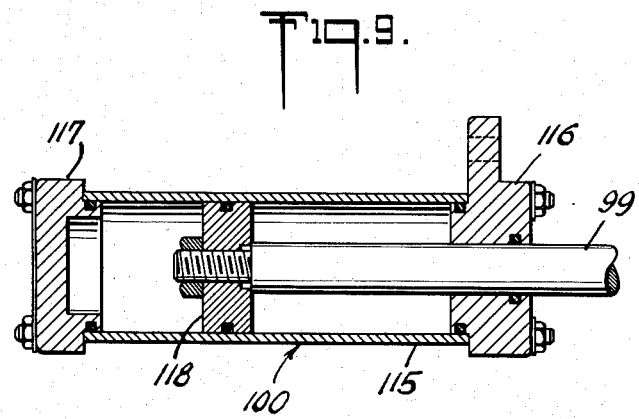
FIG. 9 is a sectional elevation of one of the hydraulic motors employed in the unit.
Figure 12:
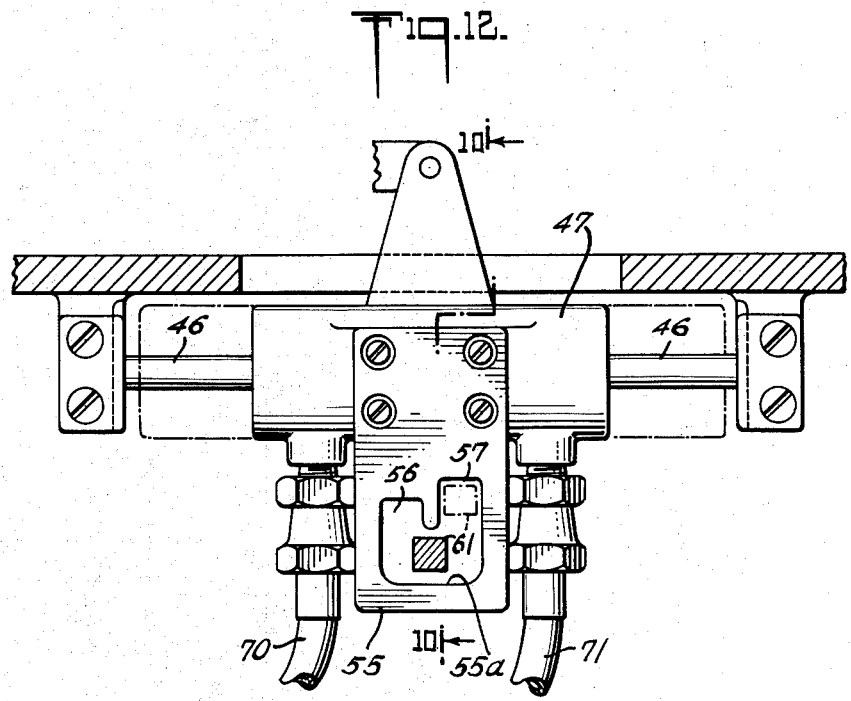
FIG. 12 is a plan of the same, as viewed from the line 12—12 of FIG. 10.

The drive cylinder 100 (FIGS. 3, 4 and 5) which causes oscillation of sector member 93 is illustrated in FIG. 9 and is formed of a cylindrical tube 115 compressed endwise between end walls 116 and 117. A piston 118 reciprocating in cylinder tube 115 has its piston rod 99 extending outwardly through one of the end walls, such as the end wall 116 for connection through link 98 to the sector member 93.

A four-way reversing valve 119 (FIGS. 4 and 5) is mounted on the bottom of frame 91 and it controls the action of the drive cylinder or motor 100. In turn it is hydraulically operated and controlled from the reversing valve 107 which will be explained more fully later herein while describing the connections of the system, shown in FIG. 15.

Referring next to FIG. 14, the diagram there displayed is a schematic, simplified, diagram only of the broad, basic principle of operation of the invention and does not illustrate the actual construction used in the illustrated embodiment of the invention. The shutters 33 are oscillated between open and closed positions by a hydraulic motor 47, and the nozzle as a unit is oscillated by the hydraulic motor 100. The motor 100 moves a bar 120 back and forth, and this bar carries spaced apart lugs 121 which alternately pick up and move in opposite directions the valve element 122 of a four-way reversing valve 123 that functionally corresponds to four-way valve 107. The lugs 121 functionally correspond to blocks 102 and 103 of FIG. 5. The fire-fighting liquid under high pressure is supplied to the device by pipe 124 as shown by the arrow. One branch 125 of pipe 124 includes a control valve 126 leading to a pipe 127 that is connected to the nozzle to supply fire fighting liquid to the discharge nozzle. Another branch 128 includes in series therein a strainer 129 and supplies some of the liquid to the reversing valve 123. These 4-way reversing valves are well-known in the hydraulic motor art and hence are not illustrated in detail. The fluid supplied to valve 123 by pipe 128 is delivered from this valve alternately to pipes 130 and 131 by movements endwise of the valve element 122. The pipe 130 or 131 to which fluid under pressure is not being delivered at any time is vented to a drain pipe 132, shown by the heavy dash line.

The pipes 130 and 131 are connected to opposite ends of hydraulic motor 100 and also to opposite ends of motor 47. Thus as valve 123 is operated by its valve element 122, some of the fire-fighting liquid under pressure will be delivered to opposite ends of the cylinders of the motors 100 and 47 to cause relative reciprocations of their pistons, which in turn open and close the shutters 33 repeatedly, and also oscillate the nozzle from side to side repeatedly, except as controlled by the details not illustrated in FIG. 14 but illustrated and described in connection with FIGS. 1–12.

FIG. 15 illustrates the piping diagram employed in connection with the structure illustrated in FIGS. 1–12. In it the drive hydraulic motor 100 which oscillates the nozzle from side to side, causes reciprocation of its piston that is coupled by link 97 to the sector member 93, and through the blocks on the sector member the link 110 (FIGS. 4 and 5) is operated back and forth to reciprocate the piston-like valve element in the four-way reversing valve 107. By adjusting the blocks 102 and 103 along the ratchet teeth 101, one may selectively control the operation of the reversing valve 107 and thus vary the range and arc of side to side oscillations of the nozzle. This coupling just described is functionally illustrated and condensed diagrammatically by the heavy dash line 132 in FIG. 15.

The reversing valve 107, so operated from the drive cylinder, delivers liquid under pressure by pipes 133 and 134 alternately to the opposite ends of the reversing valve 119, so as to move the valve element in that valve 119 back and forth hydraulically. This valve 119 when so operated will deliver fire-fighting liquid under pressure by pipes 135 and 136 to opposite ends of the drive cylinder 100 whose piston operates the sector member 93 and through it operates the valve element of valve 107. When the oscillating sector member 93 is coupled to the tube 72 and through it to the nozzle, it causes oscillation horizontally of the nozzle through a range and arc determined by the adjustment of blocks 102 and 103 along the ratchet teeth of the sector member.

The pipes 135 and 136 are also connected to hydraulic motor 47 through the pipes 70 and 71 (FIG. 12), which causes the cylinder of motor 47 to reciprocate, when not latched against such movement by handle rod 61 and latch element 60 (see FIG. 7a). The reciprocation of the cylinder of motor 47 causes repeated opening and closing of the shutters 33. In this diagram the fire-fighting liquid under high pressure is supplied through a pipe 137 corresponding to tubular extension 4 (FIG. 1) and to pipe 124 of the diagram in FIG. 14. It passes through a control valve 138, which in the actual device is operated by the handle 139 in FIG. 2 to start and stop the entire apparatus.

From the control valve the liquid passes through a suitable filter 140 and then divides, one branch 141 going directly to the reversing valve 107 and the other branch 142 going through a flow control valve 143 and then through a speed control valve 144 to the valve 119. The valve 119 has a drain or vent pipe 145 leading to a drain 146, and valve 107 has a drain or vent pipe 147 leading to the drain 146. The control valve 138 has a pipe 148 leading to the drain 146 so that when valve 138 is given a quarter of a turn counterclockwise in FIG. 15, the passage in that valve, which is shown by a dash line in FIG. 14, will connect the part of pipe 137 to the left of the valve to the drain and cut off entrance of more fire fighting liquid to the apparatus, which enables one to drain the fire-fighting liquid from the apparatus.

Each reversing valve 107 and 119, has spaced lands on its valve element which are effective upon movement of the valve element to connect the inlet pipe alternately to the outlet pipes and at the same time vent to the drain the outlet pipe which is not receiving liquid from the inlet pipe. This is a common construction in 4-way hydraulic reversing valves. The valve 119 is different from valve 107 in that the valve element of valve 119 has pistons in its ends, so that liquid under pressure delivered alternately to the ends of that valve will hydraulically reciprocate the valve element. In valve 107, its valve element is mechanically operated from the main drive cylinder 100 by the sector member 93 having the blocks 102 and 103 which, by their alternate engagement with the stop link 110, will mechanically operate the valve element of valve 107 back and forth.

It will be observed from the foregoing description and the drawings that the apparatus may be started or stopped by operation of the main control valve 139 (FIGS. 2 and 15) and even when valve 139 is in open position, the liquid supply pipe 137 may be controlled by a remote valve, not shown, and which may be in turn controlled by a thermally responsive or other means, not shown. The latch rod 61 may be set in one notch 56 or 57 depending on whether or not it is desired to have the shutters open and close repeatedly while the nozzle is oscillating. The pawl 21 is rocked to release the ratchet sector 19, the nozzle tilted to the desired inclination to the horizontal and the pawl 21 then released to hold the nozzle at that inclination.

The shutter control rod is set in either the slot 56 or 57 depending on whether one desires to have the shutters remain closed or together so that the firefighting liquid delivered will be in a single straight high velocity stream for long range fighting or whether the shutters are to open and close repeatedly as the nozzle is oscillated. When the device is so set for the results desired, firefighting liquid is supplied to the device, and immediately the nozzle is oscillated from side to side through the arc or range for which the blocks 102 and 103 are set, and the pattern or nature of the stream delivered by the nozzle will be as determined by the setting of the rod 61. This enables remote control of the operation in cases where it is not possible or practical for the operator to be at the device. The firefighting liquid is used as the motive power and the device can be close to the fire since no electrical cables that might be vulnerable to intense heat are employed. One may also grasp the handle 26 (FIG. 2), if a handle is added, and manually oscillate the nozzle horizontally instead of having the device operate automatically.

It will be understood that various changes in the details and arrangements of parts, which have been herein described and illustrated in order to explain the nature of the invention, may be made by those skilled in the art within the principle and scope of the invention as expressed in the appended claims.

We claim:

1. Apparatus for extinguishing fires, which comprises a turret body, a frame supporting said body to swing thereon in directions from side to side, said body having therein in succession in a liquid delivery conduit, a group of parallel discharge apertures, then a confined passage defined by a side wall of open mesh screen, and then a convergingly tapered discharge nozzle, with the fire fighting liquid passing in succession through said apertures, said passage and said nozzle, said body having a liquid supply passage leading to said group of apertures for delivering thereto a liquid under pressure for discharge through said apertures into said confined passage, a shutter formed of sections disposed in said confined passage which when together form a channel connecting said apertures directly to said nozzle, said sections being mounted by said head in said confined passage for a separating movement into a position in which the sections have changed relative positions and divert some of the liquid passing through said head outwardly through said open mesh screen and the balance of it through said nozzle, and means for moving said shutter sections selectively to deliver all of the liquid through said nozzle for long distance fire fighting or part through said nozzle and part through said open mesh screen for close up fire fighting.

2. The apparatus according to claim 1, wherein said last recited means includes an element moving on the exterior of said body and connected to said sections for causing said selective movement of said sections.

3. The apparatus according to claim 1, wherein said last recited means includes a hydraulic motor supplied with a part of said liquid under pressure for operating it, and connected to said shutter sections selectively to move them together or to separate them alternately.

4. The apparatus according to claim 3, and means for selectively rendering said motor effective and ineffective.

5. The apparatus according to claim 1, wherein said shutter sections are complementary, half conduit sections, which when together form a passage connecting said group of apertures to said nozzle, pivoted to said body adjacent to said apertures for movement from said together position into relatively diverting positions when it is desired to deliver a part of said fire fighting liquid through said open mesh screen, and means coupled to said sections for moving them on their pivots and having control means therefor accessible for operation on the exterior of said body.

6. The apparatus according to claim 1, wherein said head has a passageway from said nozzles to said frame in the contact face between said frame and said body, and said frame having a supply line for liquid under pressure to its contact face with said head and continuous communication with said passageway as said head swings on said frame.

7. Apparatus for extinguishing fires which comprises a support, a head pivotally mounted on said support to swing horizontally thereon, said head having a delivery passage therethrough from an inlet port, through which it can receive a liquid under pressure, to a discharge nozzle, said head in the space along said passage between the inlet port and the nozzle having its sides formed of open mesh screens, shutter sections form of complementary half conduit sections disposed in said space and pivoted to said head for movement between one position in which the sections form a substantially closed passage connecting said inlet port to said nozzle for long range fire fighting, and another position for short range fire fighting in which the sections separate somewhat and divert a part of the liquid passing through said space outwardly through said screens, and means carried by said head for moving said sections between said positions and having control means regulating its activity on the exterior of said head.

8. The apparatus according to claim 7, wherein said sections moving means includes a double acting, hydraulic motor coupled to said sections, and means connected to said port and to said hydraulic motor for supplying to both a liquid under substantial pressure.

9. Apparatus for extinguishing fires, which comprises a support, a head swiveled on said support to swing horizontally thereon, means including a reciprocating, double acting, hydraulic motor coupled to said head for moving back and forth in directions from side to side, 4-way reversing valve means for causing reversals in the direction of operations of said motor, 4-way pilot valve means operated by said motor and connected to said reversing valve means for delivering fluid under pressure to said reversing valve to cause a reversal thereof at the end of each movement of the motor, means connected to said reversing valve means and said pilot valve means for delivering to both an operating liquid under pressure, a nozzle carried by said head for movement therewith, and means connected to said nozzle for delivering thereto for discharge therefrom a fire fighting liquid under pressure during back and forth movements of said head.

10. The apparatus according to claim 9, wherein said means connected to said reversing valve means and pilot valve means for delivering thereto liquid under pressure is also connected to said means connected to said nozzle, whereby said motor and reversing valve means will be operated by fire fighting liquid under pressure.

11. Apparatus for extinguishing fires which comprises a support, a head swiveled on said support to swing sidewise to a limited extent, means including a reciprocating, double acting, hydraulic motor operatively coupled to said head for causing said sidewise movements, 4-way reversing valve means connected to said motor for supplying operating fluid to said motor and causing its alternate reciprocations, pilot valve means connected to said reversing valve for causing its reversals and operatively coupled to said motor for operation at the end of each operation of the motor to operate said reversing valve and through it cause a reversal of the motor, a nozzle device carried by and movable with said head for delivering a stream of fire fighting liquid which stream moves sidewise with said head, means within said head for causing selectively the delivery through said nozzle of a high speed concentrated long range stream of said liquid, or the diversion of some of the delivered liquid as a loose slow speed stream, control means coupled to said means within said head for varying the character of the delivered stream and having a control element accessible for operation from without said head, and means for supplying a fire fighting liquid under pressure to said reversing valve means, said pilot valve means, and said nozzle.

12. The apparatus according to claim 11, wherein said control means includes a double acting auxiliary hydraulic motor and stream varying means operated by said auxiliary motor, means connected to said four-way valve means for supplying reversing liquid to said auxiliary motor simultaneously with its supply to said first mentioned motor from said reversing valve, and selectively operable means for rendering said auxiliary motor active and inactive.

13. The apparatus according to claim 11, and clutch means for selectively coupling and uncoupling said head and said motor which moves the head sidewise.

14. Apparatus for extinguishing fires, which comprises a head having a discharge nozzle, a frame supporting said head for oscillatory sidewise moveemnts, a reciprocating hydraulic motor coupled to said head for imparting thereto oscillatory movements reversing valve means connected to and controlling the direction of operation of said motor and supplying operating liquid thereto, pilot valve means connected to said reversing valve means for supplying operating liquid thereto and causing the direction of operation of said motor to be changed, means also operated by said motor at the end of each reciprocation for operating said pilot valve means to in turn cause an operation of said reversing valve means and through it cause operation of the motor in the opposite direction, means for selectively coupling said motor to and uncoupling it from said head, and means for supplying a fire fighting liquid to said reversing valve means and to said pilot valve means.

15. The apparatus according to claim 14, and means in said head for varying the liquid stream delivered therefrom alternately as a straight stream and in a dispersed pattern, a reciprocating hydraulic motor for operating said stream-varying means in said head, and connecting means to said last mentioned motor from said first motor for varying the delivered fire stream automatically with each change in direction of the oscillatory movement of said head.

16. Apparatus for extinguishing fires, which comprises a support having therein a chamber with a connection at one side for receiving fire fighting liquid under pressure, said support having an opening in its upper face leading from said chamber, a member confined on said upper face over said opening therein for swivel action therein horizontally, and having a cavity opening into said opening, said member having a pair of spaced apart arms extending upwardly from the portion thereof which is swiveled to said support, a nozzle element rockably mounted between and by the upper ends of said arms for vertical tilting on said arms, at least one of said arms being hollow and communicating at its lower end with said cavity and at its upper end with said nozzle element through the rockable mounting of said element, means for holding said element in any of a plurality of selected angular positions into which it may be rocked on said arms, means carried by said support and connected to said member to swing the latter in a direction from side to side, means for limiting the extent of such side to side swing to a selected arc, a double acting hydraulic motor carried by said support, means coupling the movable member of said motor to said member for causing swinging of said member upon operation of said motor, reversing valve means connected to said motor for supplying operating liquid to said motor and reversing it, pilot valve means, operated by said motor at the terminals of the side by side movements, for operating said reversal valve means, and connections from said pilot valve means and said reversing valve means to a source of said fire fighting liquid under pressure, whereby all of said valve means and said motor are activated by said liquid under pressure.

17. Apparatus for extinguishing fires, which comprises a support having therein a chamber with a connection at one side for receiving fire fighting liquid under pressure, said support having an opening in its upper face leading from said chamber, a member confined on said upper face over said opening therein for swivel action therein horizontally, and having a cavity opening into said opening, said member having a pair of spaced apart arms extending upwardly from the portion thereof which is swiveled to said support, a nozzle element rockably mounted between and by the upper ends of said arms for vertical tilting on said arms, at least one of said arms being hollow and communicating at its lower end with said cavity and at its upper end with said nozzle element through the rockable mounting of said element, means for holding said element in any of a plurality of selected angular positions into which it may be rocked on said arms, means carried by said support and connected to said member to swing the latter in a direction from side to side, means for limiting the extent of such side to side swing to a selected arc, and said nozzle element containing selectively adjustable means for varying the pattern of the stream from a straight long distance stream to one with a dispersed pattern for close up fire fighting.

18. The apparatus according to claim 17, and hydraulic motor means supplied with any fire fighting liquid conveyed to said nozzle element for making said variations in pattern of said stream alternately at each change in direction of said movements of said member.

19. The apparatus according to claim 17, and selectively controlled means for rendering said last mentioned hydraulic motor means ineffective when variation in said stream is not desired.

20. Apparatus for use in extinguishing fires, which comprises a nozzle element, means mounting said element for horizontal sweep movements, means in said nozzle for varying the pattern of the delivered stream between alternate short and long range foam streams, means by which said nozzle element may be connected to a source of fire fighting liquid under substantial pressure to be discharged by said nozzle element, motor means connected to the means for connecting the nozzle element to said source and operated by said liquid under pressure from said source, supplied through said connecting means, for causing continuously repeated swings of said nozzle from side to side.

21. The apparatus according to claim 20, and motor means also operated by said liquid under pressure from said source, as supplied through said connecting means to said earlier mentioned motor means, for operating said pattern changing means within said nozzle element to change the pattern of said delivered stream alternately at the completion of each side to side swing of said nozzle element.

22. The apparatus according to claim 20 and means for selectively rendering said second mentioned motor means effective or ineffective as desired.

23. The apparatus according to claim 20, wherein said means in said nozzle element for varying the pattern of the delivered stream includes a pair of complementary half conduits pivoted to the nozzle element for movement together to form a closed conduit when a long range stream for discharge is desired and for movement in a diverging direction when a short range stream for discharge is desired, said element having open mesh screens as the side walls of that part of the nozzle element in which said half conduits are placed and approximately coextensive in length with said half conduits.

References Cited in the file of this patent
UNITED STATES PATENTS

| | | |
|---|---|---|
| 2,698,664 | Freeman | Jan. 4, 1955 |
| 2,729,295 | Edwards | Jan. 3, 1956 |
| 2,729,296 | Gurney | Jan. 3, 1956 |
| 2,753,003 | Gurney et al. | July 3, 1956 |
| 3,047,240 | Lent | July 31, 1962 |